US012785575B2

(12) United States Patent
Yang et al.

(10) Patent No.: US 12,785,575 B2
(45) Date of Patent: Nov. 3, 2026

(54) FLYBACK CONVERTER WITH TIMELY WAKEUP AND THE METHOD THEREOF

(71) Applicant: Chengdu Monolithic Power Systems Co., Ltd., Chengdu (CN)

(72) Inventors: Xiangyi Yang, Chengdu (CN); Wei Mao, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 140 days.

(21) Appl. No.: 18/961,426

(22) Filed: Nov. 26, 2024

(65) Prior Publication Data

US 2025/0175088 A1 May 29, 2025

(30) Foreign Application Priority Data

Nov. 27, 2023 (CN) ......................... 202311595477.4

(51) Int. Cl.
*H02M 3/335* (2006.01)
*H02M 1/36* (2007.01)

(52) U.S. Cl.
CPC ......... *H02M 3/33571* (2021.05); *H02M 1/36* (2013.01)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; H02M 3/33573; Y02B 70/1491
See application file for complete search history.

(56) References Cited

U.S. PATENT DOCUMENTS

| | | | | |
|---|---|---|---|---|
| 10,063,131 B2 * | 8/2018 | Yang | ................. | H02M 3/33507 |
| 10,554,136 B1 * | 2/2020 | Miletic | ............. | H02M 3/33515 |
| 11,139,744 B2 * | 10/2021 | Chang | .............. | G01R 19/16528 |
| 2014/0204628 A1 * | 7/2014 | Gaknoki | ........... | H02M 3/33515 363/21.17 |

* cited by examiner

*Primary Examiner* — Jeffrey A Gblende
(74) *Attorney, Agent, or Firm* — Ashurst Perkins Coie US LLP

(57) ABSTRACT

A flyback converter with timely wakeup is discussed. The flyback converter adopts a wakeup circuit to monitor a voltage drop at the output voltage of the flyback converter. If the output voltage drops to a certain ratio of the previous voltage value, the wakeup circuit would notice the primary side of the flyback converter, to wake up the primary power switch.

19 Claims, 3 Drawing Sheets

FLYBACK CONVERTER WITH TIMELY WAKEUP AND THE METHOD THEREOF

CROSS-REFERENCE TO RELATED APPLICATIONS

This application claims priority to and the benefit of Chinese Patent Application No. 202311595477.4, filed Nov. 27, 2023, which is incorporated herein by reference in its entirety.

BACKGROUND OF THE INVENTION

Flyback converters are widely used in voltage conversion fields. A typical flyback converter comprises: a transformer T having a primary winding T0 and a secondary winding T1, a primary power switch Q0, and a secondary rectifier Q1. When the primary power switch Q0 is turned on, the energy in an input voltage $V_{in}$ is stored in the transformer; and when the primary power switch Q0 is turned off, the secondary rectifier Q1 freewheels the current, to transfer the energy stored in the transformer to an output voltage $V_O$.

When the primary power switch keeps OFF for a long time, the output voltage Vo would fall. If the output voltage $V_O$ falls below a required voltage value, normal operation of a post stage may be affected.

Thus, there is a need to wake up the primary power switch in time.

SUMMARY OF THE INVENTION

In accordance with an embodiment of the present invention, a flyback converter is discussed. The flyback converter comprises: a primary power switch, a secondary rectifier, and a wakeup circuit. The primary power switch is configured to receive an input voltage via a primary winding of a transformer. The secondary rectifier is coupled to a secondary winding of the transformer. The flyback converter is configured to convert the input voltage to an output voltage by periodically turning on and turning off the primary power switch and the secondary rectifier. The wakeup circuit comprises: a monitor circuit, a sample-hold circuit, and a comparison circuit. The monitor circuit is configured to monitor a voltage at the wakeup terminal, to generate an enable signal with a set time length when the voltage at the wakeup terminal is lower than a reference voltage. The sample-hold circuit is configured to sample and hold an information of the output voltage in response to the enable signal within the set time length, to generate a sample-hold signal. If the output voltage is higher than a reference threshold within the set time length, the sample-hold circuit is configured to sample and hold a first feedback voltage indicative of the output voltage; and if the output voltage is lower than the reference threshold within the set time length, the sample-hold circuit is configured to sample and hold a second feedback voltage indicative of the output voltage. The comparison circuit is configured to generate a comparison signal by 1) comparing the first feedback voltage with a product of the sample-hold signal and a coefficient if the output voltage is higher than the reference threshold, or 2) comparing the second feedback voltage with the product of the sample-hold signal and the coefficient if the output voltage is lower than the reference threshold.

In addition, in accordance with an embodiment of the present invention, a wakeup circuit used in a flyback converter is discussed. The wakeup circuit includes: The wakeup circuit comprises: a monitor circuit, a sample-hold circuit, and a comparison circuit. The monitor circuit is configured to monitor a voltage at the wakeup terminal, to generate an enable signal with a set time length when the voltage at the wakeup terminal is lower than a reference voltage. The sample-hold circuit is configured to sample and hold an information of the output voltage in response to the enable signal within the set time length, to generate a sample-hold signal. If the output voltage is higher than a reference threshold within the set time length, the sample-hold circuit is configured to sample and hold a first feedback voltage indicative of the output voltage; and if the output voltage is lower than the reference threshold within the set time length, the sample-hold circuit is configured to sample and hold a second feedback voltage indicative of the output voltage. The comparison circuit is configured to generate a comparison signal by 1) comparing the first feedback voltage with a product of the sample-hold signal and a coefficient if the output voltage is higher than the reference threshold, or 2) comparing the second feedback voltage with the product of the sample-hold signal and the coefficient if the output voltage is lower than the reference threshold.

Furthermore, in accordance with an embodiment of the present invention, a method used in a flyback converter is discussed. The method comprises: monitoring a voltage at a wakeup terminal, to generate an enable signal with a set time length; comparing an output voltage of the flyback converter with a reference threshold: if the output voltage is higher than the reference threshold, sampling and holding a first feedback voltage indicative of the output voltage in response to the enable signal within the set time length, and if the output voltage is lower than the reference threshold, sampling and holding a second feedback voltage indicative of the output voltage in response to the enable signal within the set time length, to generate a sample-hold signal; comparing a product of the sample-hold signal and a coefficient with the first feedback voltage when the output voltage is higher than the voltage threshold, and comparing the product of the sample-hold signal and the coefficient with the second feedback voltage when the output voltage is lower than the voltage threshold, to generate a comparison signal; and generating a wakeup signal in response to the comparison signal and the enable signal.

DETAILED DESCRIPTION OF THE INVENTION

Embodiments of circuits for flyback converter are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
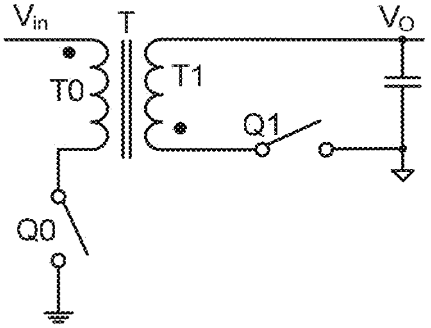
Figure 1 (Prior Art)
FIG. 1 schematically shows a typical flyback converter in the prior art.
Figure 2:
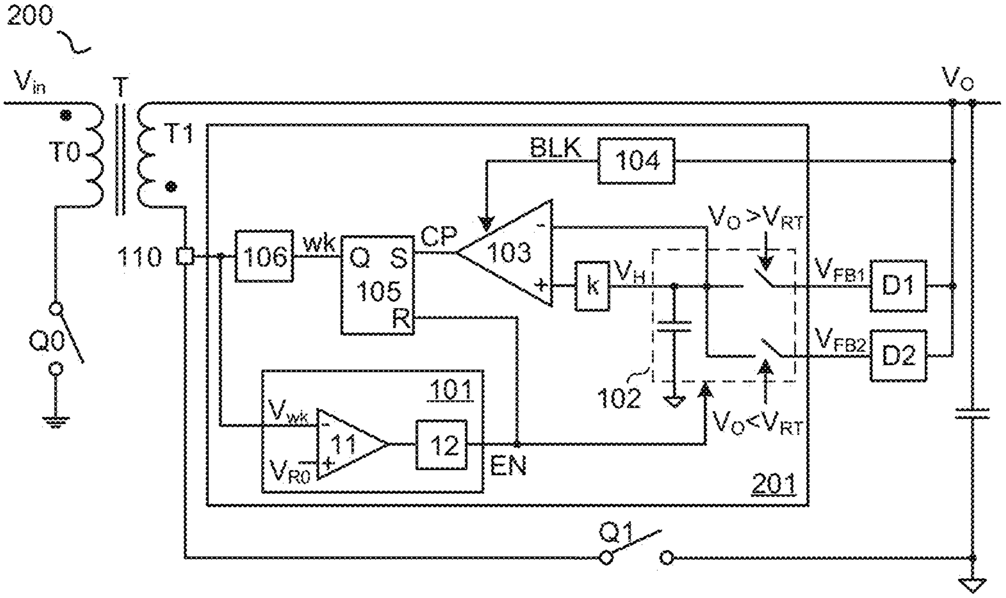
FIG. 2 schematically shows a flyback converter 200 in accordance with an embodiment of the present invention.

FIG. 2 schematically shows a flyback converter 200 in accordance with an embodiment of the present invention. In the example of FIG. 2, the flyback converter 200 comprises: a primary power switch Q0, configured to receive an input voltage $V_{in}$ via a primary winding T0 of a transformer T; and a secondary rectifier Q1, coupled to a secondary winding T1 of the transformer T. The flyback converter 200 is configured to convert the input voltage $V_{in}$ to an output voltage $V_O$ by periodically controlling the primary power switch Q0 and the secondary rectifier Q1 to be between ON and OFF states. The flyback converter 200 further comprises: a wakeup circuit 201, having a wakeup terminal 110 coupled to a common connection of the secondary rectifier Q1 and the secondary winding T1. The wakeup circuit 201 comprises: a monitor circuit 101 and a sample-hold circuit 102. The monitor circuit 101 is configured to monitor a voltage Vwk at the wakeup terminal 110. When the voltage Vwk is lower than a reference voltage (e.g. 200 mv), the monitor circuit 101 is configured to generate an enable signal EN with a set time length (e.g., 3 microseconds). The sample-hold circuit 102 is configured to sample and hold the output voltage $V_O$ in response to the enable signal EN within the set time length. Specifically, if the output voltage $V_O$ is higher than a reference threshold $V_{RT}$ within the set time length, the sample-hold circuit 102 is configured to sample and hold a first feedback voltage $V_{FB1}$ indicative of the output voltage $V_O$; and if the output voltage $V_O$ is lower than the reference threshold $V_{RT}$ within the set time length, the sample-hold circuit 102 is configured to sample and hold a second feedback voltage $V_{FB2}$ indicative of the output voltage $V_O$, to generate a sample-hold signal $V_H$.

In the example of FIG. 2, the wakeup circuit 201 further comprises: a comparison circuit 103, a shield circuit 104, a logic circuit 105, and a process circuit 106. The comparison circuit 103 is configured to generate a comparison signal CP by 1) comparing the first feedback voltage $V_{FB1}$ with a product of the sample-hold signal $V_H$ and a coefficient k if the output voltage $V_O$ is higher than the reference threshold $V_{RT}$, or 2) comparing the second feedback voltage $V_{FB2}$ with the product of the sample-hold signal $V_H$ and the coefficient k if the output voltage $V_O$ is lower than the reference threshold $V_{RT}$. The shielding circuit 104 is configured to generate a shield signal BLK when the output voltage $V_O$ passes through the reference threshold $V_{RT}$ (e.g., when the output voltage $V_O$ increases from a voltage value lower than the reference threshold $V_{RT}$ to a voltage value greater than the reference threshold $V_{RT}$, or when the output voltage $V_O$ deceases from a voltage value greater than the reference threshold $V_{RT}$ to a voltage value lower than the reference threshold $V_{RT}$), to shield the output of the comparison circuit 103, so that the comparison signal CP would have no effect on the post stages. The logic circuit 105 is configured to be set in response to the comparison signal CP, and to be reset in response to the enable signal EN, to generate a wakeup signal wk. The process circuit 106 is configured to pull low the wakeup terminal in response to the wakeup signal wk. Accordingly, a common connection of the primary power switch Q0 and the primary winding T0 would have a voltage jitter, which would be detected by the primary side. If an amplitude of the voltage jitter is lower than a reference voltage, the primary power switch Q0 would be turned on again.

In one embodiment of the present invention, the first feedback voltage $V_{FB1}$ is derived from the output voltage $V_O$ via a first feedback circuit D1, and the second feedback voltage $V_{FB2}$ is derived from the output voltage $V_O$ via a second feedback circuit D2. The coefficient k may be in the range of 90%-98%. For example, k may be equal to 97%.

In one embodiment of the present invention, shielding the output of the comparison circuit 103 may refer to the comparison circuit 103 is disabled. In one embodiment of the present invention, within a certain time period (a few microseconds, e.g., 2-10 microseconds) that the output voltage $V_O$ passes through the reference threshold $V_{RT}$, the output of the comparison circuit 103 is shielded.

In one embodiment of the present invention, the monitor circuit 101 comprises a comparator 11, configured to compare a voltage Vwk at the wakeup terminal 110 with a reference voltage $V_{R0}$. When the voltage Vwk at the wakeup terminal 110 is lower than the reference voltage $V_{R0}$, the comparator 11 is configured to enable a time window circuit 12. Then, an enable signal EN with a set time length is generated. In one embodiment of the present invention, the time window circuit 12 is configured to enable the output of the comparator 11 within the set time length. For example, when the voltage Vwk at the wakeup terminal 110 is lower than the reference voltage $V_{R0}$, the output of the comparator 11 is logical high. The time window circuit 12 would deliver this logical high signal to the output of the monitor circuit 101 within the set 3 microseconds and shield this logical high signal after the set time length is over, Thus, the enable signal with set time length is generated.

Figure 3:
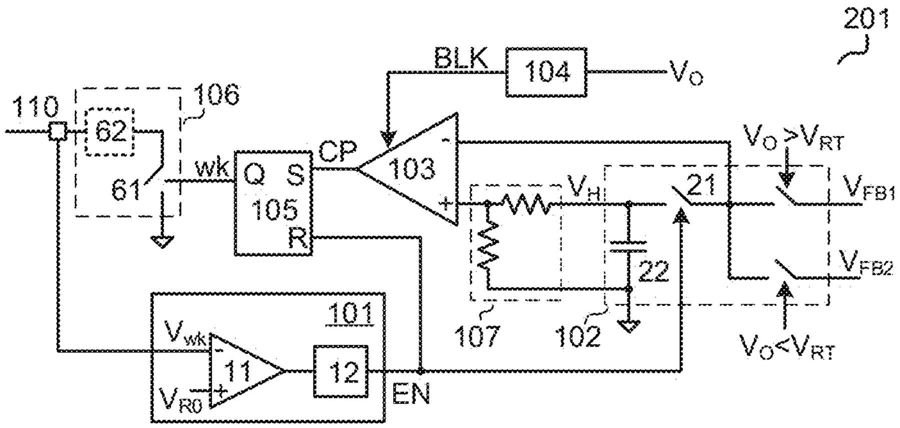
FIG. 3 schematically shows a circuit configuration of the wakeup circuit 201 in accordance with an embodiment of the present invention.

FIG. 3 schematically shows a circuit configuration of the wakeup circuit 201 in accordance with an embodiment of the present invention. The example in FIG. 3 schematically shows the circuit configurations of the sample-hold circuit 102 and the process circuit 106. Specifically, the sample-hold circuit 102 comprises: a sample switch 21 and a sample capacitor 22. The sample switch 21 is configured to be turned on in response to the enable signal EN, so that 1) the first feedback voltage $V_{FB1}$ is delivered to the sample capacitor 22 when the output voltage $V_O$ is higher than the reference threshold $V_{RT}$; and 2) the second feedback voltage $V_{FB2}$ is delivered to the sample capacitor 22 when the output voltage $V_O$ is lower than the reference threshold $V_{RT}$, to generate the sample-hold signal $V_H$ across the sample capacitor 22. The process circuit 106 comprises: a first pull-down switch 61, coupled between the wakeup terminal 110 and a reference ground. The first pull-down switch 61 is configured to be turned on in response to the wakeup signal wk, to pull low the wakeup terminal 110. In the example of FIG. 3, the process circuit 106 further comprises: a current limit circuit 62, configured to limit a current flowing through the wakeup terminal 110, to protect the wakeup terminal 110 from burn that may be caused by a high power when the first pull-down switch 61 is turned on and the wakeup terminal 110 has a high voltage.

In the example of FIG. 3, the wakeup circuit 201 further comprises: a voltage divider 107, configured to divide a voltage of the sample-hold signal $V_H$ with a division ratio of k.

Figure 4:
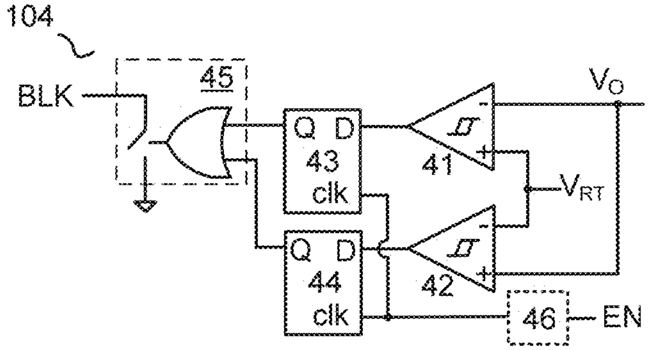
FIG. 4 schematically shows a circuit configuration of the shield circuit 104 in the wakeup circuit 201 in accordance with an embodiment of the present invention.

FIG. 4 schematically shows a circuit configuration of the shield circuit 104 in the wakeup circuit 201 in accordance with an embodiment of the present invention. In the example of FIG. 4, the shield circuit 104 comprises: a first comparator 41 and a second comparator 42, both configured to compare the output voltage $V_O$ with the reference threshold $V_{RT}$; a first flip-flop (e.g., a D flip-flop) 43, configured to deliver an output of the first comparator 41 to its output (i.e., to the output of the first flip-flop 43) in response to a rising edge of the enable signal EN; and a second flip-flop (e.g., a D flip-flop) 44, configured to deliver an output of the second comparator 42 to its output (i.e., to the output of the second flip-flop 44) in response to the rising edge of the enable signal EN. In the example of FIG. 4, when the output voltage $V_O$ deceases from a voltage value greater than the reference threshold $V_{RT}$ to a voltage value lower than the reference threshold $V_{RT}$, the first flip-flop 43 is set in response to the rising edge of the enable signal EN; and when the output voltage $V_O$ increases from a voltage value lower than the reference threshold $V_{RT}$ to a voltage value greater than the reference threshold $V_{RT}$, the second flip-flop 44 is set in response to the rising edge of the enable signal EN. The shield circuit 104 further comprises: a process unit 45, configured to generate a shield signal BLK in response to the first flip-flop 43 and the second flip-flop 44. In one embodiment of the present invention, the process unit 45 comprises a second pull-down switch, coupled between the shield signal BLK and the reference ground, so as to pull low the shield signal BLK in response to the first flip-flop 43 or the second flip-flop 44.

In one embodiment of the present invention, the shield circuit 104 further comprises: a single trigger circuit 46 (as shown in dashed line in FIG. 4). The enable signal EN is delivered to a clock terminal clk of the first flip-flop 43 and to a clock terminal clk of the second flip-flop 44 by way of the single trigger circuit 46, to insure the first flip-flop 43 and the second flip-flop 44 both have the edge trigger.

In one embodiment of the present invention, a divided voltage value of the output voltage $V_O$ may be compared with the reference threshold $V_{RT}$ instead of the output voltage $V_O$ at the first comparator 41 and the second comparator 42, to detect whether the output voltage passes through the reference threshold VRT.

In one embodiment of the present invention, both of the first comparator 41 and the second comparator 42 may comprise a hysteresis comparator, to avoid an influence on the comparison result because of the voltage oscillation at the output voltage $V_O$.

Figure 5:
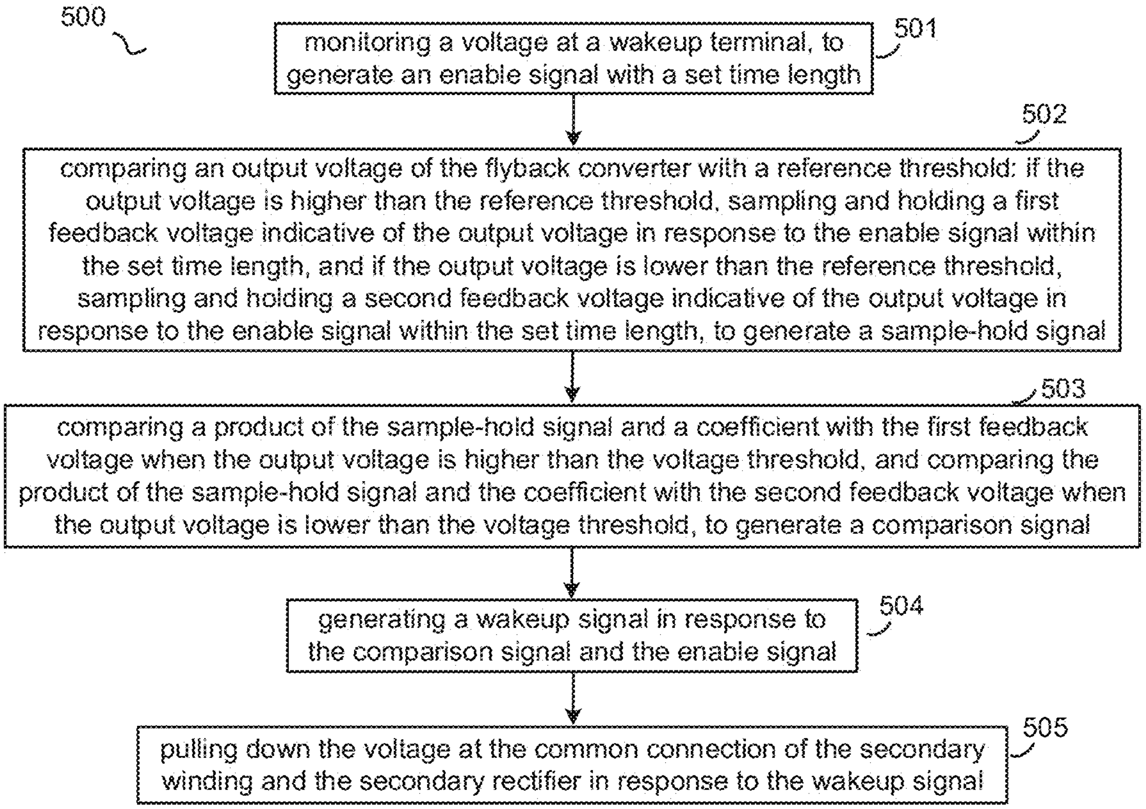
FIG. 5 schematically shows a flowchart 500 of a method used in a flyback converter in accordance with an embodiment of the present invention.

FIG. 5 schematically shows a flowchart 500 of a method used in a flyback converter in accordance with an embodiment of the present invention. The flyback converter includes a transformer having a primary winding and a secondary winding, a primary power switch coupled to the primary windingly, and a secondary rectifier coupled to the secondary winding. The primary power switch and the secondary rectifier are controlled to be turned on and off periodically, to convert an input voltage to an output voltage. The method comprises:

Step 501, monitoring a voltage at a common connection of the secondary winding and the secondary rectifier, to generate an enable signal with a set time length.

Step 502, comparing the output voltage with a reference threshold: if the output voltage is higher than the reference threshold, sampling and holding a first feedback voltage indicative of the output voltage in response to the enable signal within the set time length, and if the output voltage is lower than the reference threshold, sampling and holding a second feedback voltage indicative of the output voltage in response to the enable signal within the set time length, to generate a sample-hold signal.

Step 503, comparing a product of the sample-hold signal and a coefficient with the first feedback voltage when the output voltage is higher than the voltage threshold, and comparing the product of the sample-hold signal and the coefficient with the second feedback voltage when the output voltage is lower than the voltage threshold, to generate a comparison signal.

Step 504, generating a wakeup signal in response to the comparison signal and the enable signal. And Step 505, pulling down the voltage at the common connection of the secondary winding and the secondary rectifier in response to the wakeup signal.

In one embodiment of the present invention, the method further comprises: shielding the comparison signal at a rising edge of the enable signal when the output voltage passes through the reference threshold.

Several embodiments of the forgoing flyback converter and the method compare the real time output voltage with the previous output voltage. If the real time output voltage drops to a certain voltage (e.g., a certain ratio of the previous voltage value), the wakeup terminal is pulled down, to wake up the primary power switch in time. Accordingly, the output voltage increases. In addition, several embodiments of the forgoing flyback converter and the method select different feedback voltages with different divide ratios to be compared with the previous output voltage, and shield the comparison result during the transition of different feedback voltages. Thus, several embodiments of the forgoing flyback converter and the method are suitable for an application with a wide output voltage range.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

The invention claimed is:

1. A flyback converter, comprising:

a primary power switch, configured to receive an input voltage via a primary winding of a transformer;

a secondary rectifier, coupled to a secondary winding of the transformer, wherein the flyback converter is configured to convert the input voltage to an output voltage by periodically turning on and turning off the primary power switch and the secondary rectifier; and a wakeup circuit, having a wakeup terminal coupled to a common connection of the secondary rectifier and the secondary winding, wherein the wakeup circuit comprises:

a monitor circuit, configured to monitor a voltage at the wakeup terminal, wherein the monitor circuit is configured to generate an enable signal with a set time length when the voltage at the wakeup terminal is lower than a reference voltage;

a sample-hold circuit, configured to sample and hold an information of the output voltage in response to the enable signal within the set time length, to generate a sample-hold signal, wherein if the output voltage is higher than a reference threshold within the set time length, the sample-hold circuit is configured to sample and hold a first feedback voltage indicative of the output voltage; and if the output voltage is lower than the reference threshold within the set time length, the sample-hold circuit is configured to sample and hold a second feedback voltage indicative of the output voltage; and a comparison circuit, configured to generate a comparison signal by 1) comparing the first feedback voltage with a product of the sample-hold signal and a coefficient if the output voltage is higher than the reference threshold, or 2) comparing the second feedback voltage with the product of the sample-hold signal and the coefficient if the output voltage is lower than the reference threshold.

2. The flyback converter of claim 1, wherein the wakeup circuit further comprises:

a logical circuit, configured to be set in response to the comparison signal and to be reset in response to the enable signal, to generate a wakeup signal; and a process circuit, configured to pull low the wakeup terminal in response to the wakeup signal.

3. The flyback converter of claim 2, wherein the process circuit comprises:

a first pull-down switch, coupled between the wakeup terminal and a reference ground, wherein the first pull-down switch is configured to be turned on in response to the wakeup signal, to pull low the wakeup terminal.

4. The flyback converter of claim 1, wherein the wakeup circuit further comprises:

a shield circuit, configured to generate a shield signal when the output voltage passes through the reference threshold, to shield the comparison signal.

5. The flyback converter of claim 4, wherein the output voltage passes through the reference threshold comprises:

the output voltage deceases from a voltage value greater than the reference threshold to a voltage value lower than the reference threshold; or the output voltage increases from a voltage value lower than the reference threshold to a voltage value greater than the reference threshold.

6. The flyback converter of claim 4, wherein the shield circuit comprises:

a first comparator and a second comparator, both configured to compare the output voltage with the reference threshold;

a first flip-flop, configured to deliver an output of the first comparator to its output in response to a rising edge of the enable signal;

a second flip-flop, configured to deliver an output of the second comparator to its output in response to the rising edge of the enable signal; and a second pull-down switch, configured to pull low the shield signal in response to the output of the first flip-flop or the output of the second flip-flop.

7. The flyback converter of claim 1, wherein the monitor circuit comprises:

a comparator, configured to compare a voltage at the wakeup terminal with the reference voltage; and a time window circuit, wherein when the voltage at the wakeup terminal is lower than the reference voltage, the comparator is configured to enable the time window circuit, to have the time window circuit generate the enable signal with the set time length.

8. A wakeup circuit used in a flyback converter, comprising:

a monitor circuit, configured to monitor a voltage at a wakeup terminal, to generate an enable signal with a set time length when the voltage at the wakeup terminal is lower than a reference voltage;

a sample-hold circuit, configured to sample and hold an information of an output voltage of the flyback converter in response to the enable signal within the set time length, to generate a sample-hold signal, wherein if the output voltage is higher than a reference threshold within the set time length, the sample-hold circuit is configured to sample and hold a first feedback voltage indicative of the output voltage; and if the output voltage is lower than the reference threshold within the set time length, the sample-hold circuit is configured to sample and hold a second feedback voltage indicative of the output voltage; and a comparison circuit, configured to generate a comparison signal by 1) comparing the first feedback voltage with a product of the sample-hold signal and a coefficient if the output voltage is higher than the reference threshold, or 2) comparing the second feedback voltage with the product of the sample-hold signal and the coefficient if the output voltage is lower than the reference threshold.

9. The wakeup circuit of claim 8, further comprising:

a logical circuit, configured to be set in response to the comparison signal and to be reset in response to the enable signal, to generate a wakeup signal.

10. The wakeup circuit of claim 9, further comprising:

a process circuit, configured to pull low the wakeup terminal in response to the wakeup signal.

11. The wakeup circuit of claim 10, wherein the process circuit comprises:

a first pull-down switch, coupled between the wakeup terminal and a reference ground, wherein the first pull-down switch is configured to be turned on in response to the wakeup signal, to pull low the wakeup terminal.

12. The wakeup circuit of claim 8, further comprising:

a shield circuit, configured to generate a shield signal when the output voltage passes through the reference threshold, to shield the comparison signal.

13. The wakeup circuit of claim 12, wherein the output voltage passes through the reference threshold comprises:

the output voltage deceases from a voltage value greater than the reference threshold to a voltage value lower than the reference threshold; or the output voltage increases from a voltage value lower than the reference threshold to a voltage value greater than the reference threshold.

14. The wakeup circuit of claim 12, wherein the shield circuit comprises:

a first comparator and a second comparator, both configured to compare the output voltage with the reference threshold;

a first flip-flop, configured to deliver an output of the first comparator to its output in response to a rising edge of the enable signal;

a second flip-flop, configured to deliver an output of the second comparator to its output in response to the rising edge of the enable signal; and a second pull-down switch, configured to pull low the shield signal in response to the output of the first flip-flop or the output of the second flip-flop.

15. The wakeup circuit of claim 8, wherein the monitor circuit comprises:

a comparator, configured to compare a voltage at the wakeup terminal with the reference voltage; and a time window circuit, wherein when the voltage at the wakeup terminal is lower than the reference voltage, the comparator is configured to enable the time window circuit, to have the time window circuit generate the enable signal with the set time length.

16. A method used in a flyback converter, comprising:

monitoring a voltage at a wakeup terminal, to generate an enable signal with a set time length;

comparing an output voltage of the flyback converter with a reference threshold: if the output voltage is higher than the reference threshold, sampling and holding a first feedback voltage indicative of the output voltage in response to the enable signal within the set time length, and if the output voltage is lower than the reference threshold, sampling and holding a second feedback voltage indicative of the output voltage in response to the enable signal within the set time length, to generate a sample-hold signal;

comparing a product of the sample-hold signal and a coefficient with the first feedback voltage when the output voltage is higher than the voltage threshold, and comparing the product of the sample-hold signal and the coefficient with the second feedback voltage when the output voltage is lower than the voltage threshold, to generate a comparison signal; and generating a wakeup signal in response to the comparison signal and the enable signal.

17. The method of claim 16, further comprising:

pulling down the voltage at wakeup terminal in response to the wakeup signal.

18. The method of claim 16, further comprising:

shielding the comparison signal at a rising edge of the enable signal when the output voltage passes through the reference threshold.

19. The method of claim 18, wherein the output voltage passes through the reference threshold comprises:

the output voltage deceases from a voltage value greater than the reference threshold to a voltage value lower than the reference threshold; or the output voltage increases from a voltage value lower than the reference threshold to a voltage value greater than the reference threshold.

* * * * *